UNITED STATES PATENT OFFICE.

JOSEPH A. AMBLER, OF NORWICH, CONNECTICUT, HERBERT A. LUBS, OF SAVANNAH, GEORGIA, AND HARRY D. GIBBS, OF SAN FRANCISCO, CALIFORNIA.

PROCESS FOR THE MANUFACTURE OF CYMENE SULFONIC ACIDS.

1,316,823.

No Drawing.

Specification of Letters Patent. Patented Sept. 23, 1919.

Application filed March 21, 1919. Serial No. 284,225.

(FILED UNDER THE ACT OF MARCH 3, 1883, 22 STAT. L., 625.)

*To all whom it may concern:*

Be it known that we, JOSEPH A. AMBLER, HERBERT A. LUBS and HARRY D. GIBBS, citizens of the United States of America, and employees of the Department of Agriculture, residing in the city of Norwich, county of New London, State of Connecticut, in the city of Savannah, county of Chatham, State of Georgia, and in the city of San Francisco, county of San Francisco, State of California, respectively, (whose post-office address is Washington, D. C.,) have jointly invented a new and useful Process for the Manufacture of Cymene Sulfonic Acids.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon.

Heretofore the sulfonic acids of cymene have been made only in small quantities by dissolving the cymene in concentrated sulfuric acid.

We have found that when cymene is sulfonated in the gaseous state, and the products removed rapidly from the reaction vessel, much less sulfuric acid is necessary for the sulfonation.

We shall illustrate our invention by describing the process for the manufacture of cymene disulfonic acid, although the invention is not restricted to this particular sulfonic acid.

Sulfuric acid of specific gravity 1.84 is caused to descend over baffle-plates, pebbles or coarse pumice stones, in a tower, which is heated and maintained at a temperature of 180° to 190° centigrade. Para-cymene is heated to boiling and its vapors are passed up through the tower. The vapors come into contact with the descending hot sulfuric acid and are completely absorbed by it, with the formation of water and cymene disulfonic acids. The water escapes from the tower as steam and may be condensed in any suitable condenser attached at or near the top of the tower. The sulfonic acids, together with a slight excess of unused sulfuric acid, are carried downward by means of gravity, and discharged from the bottom of the tower. The product contains a considerable amount of cymene-2-sulfonic acid, which is separated from the disulfonic acid by well known means, such as, for example, the formation of the barium salts by neutralizing with barium carbonate, filtering the solution of the salts of the sulfonic acids from the barium sulfate and concentrating the vapor to crystallization, when the barium salt of the mono sulfonic acid of cymene separates first, leaving the barium salt of the disulfonic acid in solution from which it may be obtained by the addition of alcohol.

Thus our invention furnishes a ready means of manufacturing the sulfonic acids of cymene in a continuous and automatic manner, and using less sulfuric acid than is commonly employed in sulfonation processes.

It is obvious that other concentrations of sulfuric acid than that having specific gravity 1.85 may be used, that other temperatures than 180° to 190° may be used, and that other acids than cymene disulfonic acid and cymene sulfonic acid may be manufactured by this method, and our invention is not restricted to such sulfuric acid, temperature, or cymene sulfonic acid, but has a general application to the sulfonation of cymene in the gaseous state.

Having thus described our invention, we claim—

1. A continuous process for the manufacture of sulfonic acids of cymene by causing the vapors of cymene to mix with the vapors of sulfuric acid.

2. A continuous processs for the manufacture of sulfonic acids of cymene by causing the vapors of cymene to come into contact with a descending current of sulfuric acid.

3. A continuous process for the manufacture of sulfonic acids of cymene by causing the vapors of cymene to come into contact with a descending current of sulfuric acid, heated and maintained at a temperature at least approximately as high as that at which cymene boils.

4. A continuous process for the manufacture of sulfonic acids of cymene by causing the vapors of cymene to rise through a tower in which a stream of sulfuric acid is descending over obstructions to break and retard its fall.

5. A continuous process for the manufacture of sulfonic acids of cymene by causing the vapors of cymene to rise through a tower in which a stream of sulfuric acid, heated and maintained at a temperature at least approximately as high as that at which cymene boils, is descending over obstructions to break and retard its fall.

6. A continuous process for the manufacture of cymene-2-sulfonic acid by causing the vapors of cymene to rise through a tower in which a stream of sulfuric acid, heated and maintained at a temperature at least approximately as high as that at which cymene boils, is descending over obstructions to break and retard its fall.

7. A continuous process for the manufacture of sulfonic acids of cymene by causing the vapors of cymene to rise through a tower in which a partial vacuum is maintained while a stream of sulfuric acid, heated and maintained at a temperature at least approximately as high as that at which cymene boils in said partial vacuum, is descending over obstructions to break and retard its fall.

In testimony whereof, we affix our signatures in the presence of two subscribing witnesses.

JOSEPH A. AMBLER.
HERBERT A. LUBS.
HARRY D. GIBBS.

Witnesses:
 Louis E. Wise,
 Laura A. Skinner.